United States Patent
Enkisch-Krug et al.

(10) Patent No.: US 9,499,718 B2
(45) Date of Patent: Nov. 22, 2016

(54) PROCESS FOR THE PRODUCTION OF AN OEM BASE COAT/CLEAR TOP COAT MULTI-LAYER COATING

(71) Applicant: AXALTA COATING SYSTEMS IP CO., LLC, Wilmington, DE (US)

(72) Inventors: Charlotte Enkisch-Krug, Hagen (DE); Petra Stoffel, Cologne (DE); Carmen Flosbach, Wuppertal (DE)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 199 days.

(21) Appl. No.: 14/197,340

(22) Filed: Mar. 5, 2014

(65) Prior Publication Data

US 2014/0287152 A1 Sep. 25, 2014

Related U.S. Application Data

(60) Provisional application No. 61/803,853, filed on Mar. 21, 2013.

(51) Int. Cl.

| | |
|---|---|
| *B05D 3/00* | (2006.01) |
| *C09D 175/06* | (2006.01) |
| *B05D 1/00* | (2006.01) |
| *C08G 18/66* | (2006.01) |
| *C08G 18/75* | (2006.01) |
| *C08G 18/08* | (2006.01) |
| *C08G 18/12* | (2006.01) |
| *C09D 175/12* | (2006.01) |
| *B05D 7/00* | (2006.01) |

(52) U.S. Cl.
CPC ............ *C09D 175/06* (2013.01); *B05D 1/007* (2013.01); *B05D 3/007* (2013.01); *B05D 7/532* (2013.01); *C08G 18/0823* (2013.01); *C08G 18/12* (2013.01); *C08G 18/6659* (2013.01); *C08G 18/755* (2013.01); *C09D 175/12* (2013.01)

(58) Field of Classification Search
CPC .... B05D 7/532; B05D 7/53; C08G 18/0823; C08G 18/755; C08G 18/12; C08G 18/6659; C09D 175/12; C09D 175/06
See application file for complete search history.

(56) References Cited

U.S. PATENT DOCUMENTS

| | | | |
|---|---|---|---|
| 5,976,343 A | 11/1999 | Schlaak | |
| 6,221,949 B1 | 4/2001 | Gross et al. | |
| 6,329,020 B1 * | 12/2001 | Patzschke | ............ C08F 283/006 427/299 |
| 7,531,614 B2 | 5/2009 | Hille et al. | |
| 2006/0128885 A1 | 6/2006 | Rische et al. | |
| 2006/0240264 A1 | 10/2006 | Gertzmann et al. | |
| 2007/0238830 A1 | 10/2007 | Gertzmann et al. | |

FOREIGN PATENT DOCUMENTS

| | | |
|---|---|---|
| DE | 2624442 A1 | 12/1976 |
| DE | 19849208 A1 | 4/2000 |

OTHER PUBLICATIONS

DPMA, German Office Action issued in Application No. 102014204592A, dated Dec. 1, 2015.
Elvers, Barbara, et al. "Polyurethanes," Ullmann's Encyclopaedia of Industrial Chemistry, 5th Edition, pp. 678-679, vol. A21.

* cited by examiner

*Primary Examiner* — Xiao Zhao
(74) *Attorney, Agent, or Firm* — Lorenz & Kopf LLP

(57) ABSTRACT

A process for the production of an OEM base coat/clear top coat multi-layer coating wherein a waterborne base coat composition is spray-applied by electrostatically-assisted high speed rotary atomization is provided. The waterborne base coat composition comprises binder solids comprising about 20 to about 100 wt. % of an aqueously dispersed polyurethane urea resin with a carboxyl number of 10 to 50 mg KOH/g.

11 Claims, No Drawings

PROCESS FOR THE PRODUCTION OF AN OEM BASE COAT/CLEAR TOP COAT MULTI-LAYER COATING

CROSS-REFERENCE TO RELATED APPLICATION

This disclosure claims priority to U.S. Provisional Application No. 61/803,853, filed Mar. 21, 2013, which is incorporated herein by reference in its entirety.

TECHNICAL FIELD

The technical field relates to a process for the production of an OEM (original equipment manufacture) base coat/clear top coat multi-layer coating.

BACKGROUND

Automotive coatings consist, as a rule, of an EDC (electrodeposition coating) primer layer, an optionally present primer surfacer layer (filler layer), and a top coat comprising a color- and/or special effect-imparting base coat layer and an outer protective and gloss-imparting clear coat layer. The base coat layer may consist of one single or two or more same or different base coat sublayers, i.e. the base coat sublayers may have been applied from the same base coat composition or from different, for example, differently pigmented base coat compositions.

Today, waterborne base coat compositions are state of the art and it is quite common to use aqueous polyurethane urea resin dispersions as binders therein.

A well-known method for the production of aqueous polyurethane urea resin dispersions is the so-called acetone process (see Ullmann's Encyclopaedia of Industrial Chemistry, 5th Edition, Vol. A21, pages 678-679): Typically, an NCO-functional hydrophilic polyurethane prepolymer is made by addition reaction of polyols and polyisocyanates in the presence of acetone as diluent. The NCO-functional hydrophilic polyurethane prepolymer may be reacted with a NCO-reactive chain extender like, for example, a polyamine or a hydrazine derivative. The acetone solution is converted into an aqueous dispersion by mixing with water. If a chain extension reaction is performed, it may happen before and/or after the conversion into the aqueous dispersion. Finally the acetone is removed to the desired degree, in particular, by distilling it off US 2006/0240264 A1 and US 2007/0238830 A1 disclose N-alkyl pyrrolidone-free aqueous polyurethane urea dispersions and methods for the production thereof.

SUMMARY

In accordance with an exemplary embodiment, a process for the production of an OEM base coat/clear top coat multi-layer coating is provided. The process comprises the steps:

(1) providing a substrate to be provided with an OEM base coat/clear top coat multi-layer coating, (2) spray-applying a waterborne base coat composition on said substrate by electrostatically-assisted high speed rotary atomization to form a base coat layer, (3) spray-applying a clear coat composition on the base coat layer to form a clear top coat layer, and (4) jointly curing the base coat and the clear top coat layers, wherein the waterborne base coat composition comprises water, at least one pigment and resin solids, the resin solids consisting of binder solids and, optionally, crosslinker (crosslinking agent) solids, wherein said binder solids consist of about 20 to about 100 wt. % (weight-%) of an aqueously dispersed polyurethane urea resin with a carboxyl number of about 10 to about 50 mg KOH/g and 0 to about 80 wt. % of other binders, wherein the sum of the wt. % totals 100 wt. %, wherein said aqueously dispersed polyurethane urea resin is made by a process comprising the steps:

(i) producing a non-gelled polyurethane urea prepolymer with a free isocyanate group content of about 0.5 to about 4.5 wt. % by reacting at least one polyol, at least one compound having one primary or secondary amine group and a molar mass of about 31 to about 300, at least one tertiary amine-neutralized polyhydroxycarboxylic acid, and at least one polyisocyanate, in the presence of at least one inert organic solvent, (ii) converting the so obtained inert organic solvent solution of the polyurethane urea prepolymer (=solution of the polyurethane urea prepolymer in inert organic solvent) into an aqueous dispersion by mixing with water, and (iii) chain extending the polyurethane urea prepolymer by reacting the free isocyanate groups thereof with at least one compound having at least two amino groups capable of addition to isocyanate groups to form further urea groups, wherein the at least one compound having one primary or secondary amine group and a molar mass of about 31 to about 300 is used in a proportion of about 0.02 to about 0.15 equivalents relative to the NCO provided by the at least one polyisocyanate employed in step (i).

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The term "solids" is used herein; it means non-volatile components. For example, the solids of the waterborne base coat composition employed in the process of the invention are formed by its resin solids plus pigments plus optionally present fillers plus optionally present non-volatile additives. Resin solids means binder solids plus, if present, crosslinker solids. Binder solids means the solids contribution of one or more binders (film formers). Crosslinker solids means the solids contribution of one or more crosslinkers. The solids of a volatile matter-containing coating composition or a coating intermediate like, for example, a binder solution or a binder dispersion, can be determined in accordance with DIN EN ISO 3251 (60 minutes 150° C.).

The term "electrostatically-assisted high speed rotary atomization" is used herein. Electrostatically-assisted high speed rotary atomization is a common OEM spray-coating method for substrates, i.e. a common industrial spray-coating method for providing mass-produced substrates with an original coating. Examples of substrates which are typically industrially spray-coated with an OEM base coat/clear top coat multi-layer coating include various mass-produced goods; examples include, in particular, automotive substrates like automobile bodies, automobile body parts and other car parts.

The term "inert organic solvent" is used herein. It means organic solvents which are inert towards free isocyanate groups.

It has been found that the production of an OEM base coat/clear top coat multi-layer coating involving the spray-application of the base coat layer by electrostatically-assisted high speed rotary atomization of a waterborne base coat composition can be improved in terms of higher productivity and less formation of scrap, when the waterborne base coat composition is such as disclosed in the section "Summary of the Invention" above, in particular, when it comprises such binder solids as there disclosed. When the disclosed waterborne base coat composition is used, then the formation of undesired threads during the spray-application by electrostatically-assisted high speed rotary atomization is minimized or even eliminated. Also, the formation of undesired specks in the base coat layer formed on a respective substrate can be minimized or even eliminated.

In a coating operation, the susceptibility of the coating composition to the formation of said threads is not only detrimental with regard to the appearance of the resulting coating, but it means also an unwanted effort in terms of cleaning the spraying equipment from said threads.

These undesired phenomena can be seen, in particular, when said electrostatically-assisted high speed rotary atomization is carried out in the course of an industrial mass-production OEM base coat/clear top coat multi-layer coating process. An industrial mass-production OEM base coat/clear top coat multi-layer coating process is distinguished, among others, by the fact that the substrates are coated in several different colors (the color program). For productivity reasons the substrates are typically arranged in so-called color blocks (blocks of same color) and conveyed on a continuously moving mass-production paint application line. The more substrates that belong to one color block, the higher is the risk of the occurrence of the aforedescribed undesired phenomena.

In the lab, the susceptibility of a coating composition, for example, a waterborne base coat composition, to form threads can be assessed by a "tape peel-off" test. In this test, one or more non-overlapping strips of masking tape are applied to a test panel to create boundary lines of taped and non-taped substrate. A coating layer of the coating composition to be tested is then sprayed either in a uniform layer thickness or as a wedge onto the test panel provided with the tape strips. After a defined length of time between spraying and testing, for example, within about 3 to about 30 minutes (at a temperature in the range of about 20 to about 80° C.), a strip of tape is pulled slowly away from the panel with the tape held at about a 45 degree angle from the substrate. If threads of the coating are observed between the edge of the masking tape and the test panel substrate, the test coating composition is shown to be susceptible to the formation of threads. Multiple strips of masking tape allow multiple tests at different times after spraying of the coating on the test panel, for example, 5, 10, 15, 20, 25 and 30 minutes after spraying.

During the process of applying coatings to substrates or its parts, it is sometimes necessary for the robotic or manual handling of the recently coated parts. The applicant has found that after the spray-application of the waterborne base coat, i.e., step (2) of the disclosed process, and prior to being dried, the base coat layer is not sticky or susceptible to the formation of threads upon being touched.

The process contemplated herein is an OEM base coat/clear top coat multi-layer coating process, in particular, an automotive OEM base coat/clear top coat multi-layer coating process. The phrase "automotive OEM base coat/clear top coat multi-layer coating" refers to an automotive original base coat/clear top coat multi-layer coating as opposed to an automotive refinish or repair base coat/clear top coat multi-layer coating. Automotive OEM base coat/clear top coat multi-layer coatings are typically applied in an industrial mass-production coating line with a high degree of automation.

In step (1) of the process contemplated herein a substrate is provided. The substrate is typically one made by a serial production process. Typical examples of such mass-produced substrates include automotive substrates like automobile bodies, automobile body parts and other car parts like rims. Automotive substrates can be plastics or metal substrates or so-called mixed construction substrates comprising plastics as well as metal. As already said, the automotive substrates may be automotive bodies or automotive body parts; automotive bodies can be metal substrates or mixed construction substrates, while automotive body parts can be metal substrates, plastics substrates or mixed construction substrates. Automotive plastics substrates may be uncoated or they may have a precoating like a conductive primer layer. Automotive metal substrates may have a precoating like a conventional primer layer, for example, an EDC primer layer, and, optionally, also a conventional primer surfacer layer.

In step (2) of the process of the invention a waterborne base coat composition is spray-applied on the substrate provided in step (1) by electrostatically-assisted high speed rotary atomization to form a base coat layer on the substrate.

The waterborne base coat composition is an aqueous coating composition having a solids content in the range of, for example, about 10 to about 50 wt. %. The waterborne base coat composition comprises water, pigment(s) and resin solids. It may further comprise the following optional components: filler(s), organic solvent(s) and conventional additive(s). The waterborne base coat composition has a ratio by weight of pigments to resin solids of, for example, about 0.05:1 to about 2.5:1.

The resin solids content of the waterborne base coat composition may be in the range of, for example, about 10 to about 40 wt. % and it consists of binder solids and, if present, crosslinker solids. Pigment paste resins which may be contained in the waterborne base coat composition are counted as binders. The resin solids composition of the waterborne base coat composition is, for example, about 60 to about 100 wt. % binder solids plus 0 to about 40 wt. % crosslinker solids, wherein the sum of the wt. % totals 100 wt. %. The binder solids of the waterborne base coat composition comprise about 20 to about' 100 wt. % of the polyurethane urea resin, which is present in aqueously dispersed form, and 0 to about 80 wt. % of one or more other binders, wherein the sum of the wt. % totals 100 wt. %. In a preferred embodiment, the binder solids of the waterborne base coat composition comprise about 20 to about 80 wt. % of the polyurethane urea resin and about 20 to about 80 wt. % of one or more other binders, wherein the sum of the wt. % totals 100 wt. %.

As already mentioned, the waterborne base coat composition comprises an aqueously dispersed polyurethane urea resin, or, in other words, an aqueous polyurethane urea resin dispersion. The polyurethane urea resin has fully or partly neutralized carboxyl groups corresponding to a carboxyl number of about 10 to about 50 mg KOH/g. The aqueous polyurethane urea resin dispersion is made by a process comprising the steps:

(i) producing a non-gelled polyurethane urea prepolymer with a free isocyanate group content of about 0.5 to about 4.5 wt. % by reacting at least one polyol, at least one compound having one primary or secondary amine group and a molar mass of about 31 to about 300, at least one tertiary amine-neutralized polyhydroxycarboxylic acid, and at least one polyisocyanate, in the presence of at least one inert organic solvent, (ii) converting the inert organic solvent solution of the polyurethane urea prepolymer into an aqueous dispersion by mixing with water, and (iii) chain extending the polyurethane urea prepolymer by reacting the free isocyanate groups thereof with at least one compound having at least two amino groups capable of addition to isocyanate groups to form further urea groups, wherein the at least one compound having one primary or secondary amine group and a molar mass of about 31 to about 300 is used in a proportion of about 0.02 to about 0.15 equivalents relative to the NCO provided by the at least one polyisocyanate employed in step (i).

The term "content of free isocyanate groups" or "free isocyanate group content" is used herein. It is calculated as content of free NCO (molar mass=42) per 100 g of a material and is expressed in wt. %. In other words, 100 g of solids of the isocyanate-functional polyurethane urea prepolymer produced in step (i) contain about 0.5 to about 4.5 g NCO.

In step (i) a non-gelled polyurethane urea prepolymer with a free isocyanate group content of about 0.5 to about 4.5 wt. % is prepared by reacting at least one polyol, at least one compound having one primary or secondary group and a molar mass of about 31 to about 300, at least one tertiary amine-neutralized polyhydroxycarboxylic acid, and at least one polyisocyanate, in the presence of one or more inert organic solvents.

The at least one polyol used in step (i) may comprise polyols in the form of low molar mass compounds defined by empirical and structural formula but also oligomeric or polymeric polyols with number-average molar masses of, for example, up to about 2,000, in particular, of about 500 to about 2,000. Examples of oligomeric or polymeric polyols are corresponding hydroxyl-functional polyethers, polyesters or polycarbonates.

All statements made in the present description and the claims in relation to number-average molar masses relate to number-average molar masses determined by GPC (gel permeation chromatography, polystyrene standards, polystyrene gel as stationary phase, tetrahydrofuran as mobile phase).

Examples of low molar mass polyols that may be used in step (i) are low molar mass diols such as ethylene glycol, the isomeric propane- and butanediols, 1,5-pentanediol, 1,6-hexanediol, 1,10-decanediol, 1,12-dodecanediol, bisphenol A, neopentyl glycol, butylethylpropanediol, the isomeric cyclohexanediols, the isomeric cyclohexanedimethanols, hydrogenated bisphenol A, tricyclodecanedimethanol, and dimer fatty alcohol.

Examples of low molar mass polyols with more than two hydroxyl groups per molecule that may be used in step (i) are compounds such as glycerol, trimethylolethane and trimethylolpropane.

Examples of oligomeric or polymeric polyols that may be used in step (i) are oligomeric or polymeric diols such as telechelic (meth)acrylic polymer diols, polyester diols, polyether diols, polycarbonate diols, each with a number-average molar mass of, for example, up to about 2,000, in particular, of about 500 to about 2,000.

Examples of oligomeric or polymeric polyols with a hydroxyl functionality greater than 2 that may be used in step (i) are corresponding polyester polyols, polyether polyols, polycarbonate polyols, each with a number-average molar mass of, for example, up to about 2,000, in particular, of about 500 to about 2,000.

Generally and also preferably, the at least one compound having one primary or secondary amine group and a molar mass of about 31 to about 300 used in step (i) does not contain further functional groups capable of reacting with isocyanate groups.

The at least one compound having one primary or secondary amine group and a molar mass of about 31 to about 300 (hereinafter also called "monoamine compound") used in step (i) may be a monoamine having the amine group bonded to (cyclo)aliphatic carbon, for example, a (cyclo)aliphatic monoamine compound with 1 to 18, preferably 1 to 12, and in particular 1 to 8 carbon atoms. (Cyclo)aliphatic means cycloaliphatic and/or aliphatic.

Examples of monoamines having the amine group bonded to (cyclo)aliphatic carbon include methylamine, ethylamine, n-propylamine, isopropylamine, n-butylamine, iso-butylamine, tert-butylamine, 1-phenylethylamine, 2-phenylethylamine, 3-methoxypropylamine, cyclohexylamine, 2-ethylhexylamine, 3-methylbutylamine, n-octylamine, isononylamine, dimethylamine, diethylamine, di-n-propylamine, di-n-butylamine, di-isoamylamine, N-ethylbutylamine, di-(2-ethylhexyl)amine, di-n-octylamine and diisononylamine Preferred examples include n-propylamine, iso-propylamine, n-butylamine, iso-butylamine, 3-methoxypropylamine, 2-ethylhexylamine, 3-methylbutylamine, n-octylamine, isononylamine, di-n-propylamine, di-n-butylamine, N-ethylbutylamine, di-n-octylamine and diisononylamine The most preferred examples are 2-ethylhexylamine and di-n-butylamine.

It is an essential feature of the invention, that the monoamine compound is used in a proportion of about 0.02 to about 0.15 equivalents relative to the NCO (i.e. the NCO equivalents) provided by the at least one polyisocyanate employed in step (i).

In step (i), in addition to the at least one polyol and the at least one monoamine compound, at least one tertiary amine-neutralized polyhydroxycarboxylic acid is reacted with the at least one polyisocyanate.

Examples of polyhydroxycarboxylic acids that may be used in step (i) are polyhydroxymonocarboxylic acids such as dimethylol propionic acid or dimethylol butyric acid and polyhydroxypolycarboxylic acids such as tartaric acid. The polyhydroxymonocarboxylic acids are preferred.

The at least one polyhydroxycarboxylic acid is used in tertiary amine-neutralized form. The ratio of neutralizing tertiary amine to polyhydroxycarboxylic acid corresponds to a degree of neutralization of, for example, about 60 to about 120%, preferably about 100 to about 110%.

Examples of tertiary amines that may be used for neutralizing the at least one polyhydroxycarboxylic acid comprise tertiary amines inert towards isocyanate groups such as triethylamine, N-methylpiperidine, N-methylmorpholine, triisopropylamine and dimethylisopropylamine Dimethylisopropylamine and triethylamine are especially preferred.

Examples of polyisocyanates that may be used in step (i) are aliphatic, cycloaliphatic, aromatic or araliphatic diisocyanates such as, for example, 1,6-hexane diisocyanate, isophorone diisocyanate, bis(4-isocyanatocyclohexyl)methane, bis(4-isocyanatophenyl)methane, tetramethylxylylene diisocyanate and 1,4-cyclohexane diisocyanate. Further examples are polyisocyanates having more than two isocyanate groups, such as, trisisocyanatononane and polyisocyanates derived from the diisocyanates mentioned in the preceding sentence, for example, isocyanurate, uretdione or biuret derivatives thereof.

The at least one polyol, the at least one monoamine compound, the at least one polyhydroxycarboxylic acid and the at least one polyisocyanate are selected in such a way, in terms of type and amount, that in step (i) a non-gelled, preferably linear polyurethane urea prepolymer with a free isocyanate group content of about 0.5 to about 4.5 wt. % is formed. Step (i) is thus carried out with an excess of isocyanate; for example, the NCO:total OH equivalent ratio employed in step (i) is about 2:1 to about 1.05:1, preferably about 1.5:1 to about 1.05:1. "Total OH" refers to the OH groups which are provided by the at least one polyol and the at least one polyhydroxycarboxylic acid.

The sequence of the addition of the at least one polyol, the at least one monoamine compound, the at least one tertiary amine-neutralized polyhydroxycarboxylic acid and the at least one polyisocyanate is not fixed. Preferably, a mixture of the at least one polyol, the at least one monoamine compound and the at least one tertiary amine-neutralized polyhydroxycarboxylic acid is provided in inert organic solvent, and then the at least one polyisocyanate, optionally dissolved in inert organic solvent, is added. Conventional catalysts for polyurethane synthesis, such as diorganotin compounds, may be added at any time. The reaction temperature may be limited by the boiling point of the inert organic solvent or inert organic solvent mixture used as a reaction medium and is generally in the range of about 40 to about 85° C. The end of the reaction is reached when an NCO concentration which is not decreasing, or is only decreasing slowly, is achieved or when a desired NCO concentration is reached. This can be detected analytically, for example, by means of IR-spectroscopy or titration.

As already mentioned, step (i) takes place in the presence of an inert organic solvent or a mixture of a plurality of inert organic solvents. Examples of suitable inert organic solvents are ketones like methylethyl ketone and acetone and N-alkyl pyrrolidones. It is preferred to work in the presence of a ketone, in particular, acetone as the only inert organic solvent.

The polyurethane urea prepolymer formed in step (i) has a free isocyanate group content of about 0.5 to about 4.5 wt. % and a carboxyl number of, for example, over about 10 to about 55 mg KOH/g. Depending on the at least one polyol, the at least one polyhydroxycarboxylic acid and the at least one polyisocyanate, the polyurethane urea prepolymer may be a linear or branched polyurethane urea, but is in any case a non-gelled polyurethane urea. Preferably, it is a linear polyurethane urea. The number-average molar mass of the polyurethane urea prepolymer formed in step (i) cannot be determined directly by GPC, and therefore the isocyanate groups may initially be defunctionalized, for example, by reacting with dibutylamine. The number-average molar mass, which is determined by GPC, of the polyurethane urea prepolymer which has been NCO-defunctionalized by reacting with dibutylamine is in the range of, for example, about 3,000 to about 15,000.

In step (ii), the inert organic solvent solution of the non-aqueous, isocyanate- and carboxylate-functional polyurethane urea prepolymer is converted by mixing with water into an aqueous dispersion with a solids content of, for example, about 30 to about 47 wt. %. In order to form the aqueous dispersion, water can be added to the polyurethane urea prepolymer solution or the polyurethane urea prepolymer solution can be added to water. Generally, the mixing with water takes place at a temperature below about 60° C.

At the point of mixing, the temperature of the inert organic solvent solution of the polyurethane urea prepolymer may be, for example, about 40 to about 60° C., and that of the water may be, for example, about 10 to about 40° C.

In step (iii), the chain extension of the isocyanate- and carboxylate-functional polyurethane urea prepolymer, which has been dispersed in water in step (ii), takes place by reacting with at least one compound with at least two amino groups capable of addition to isocyanate groups. During chain extension the isocyanate groups of the polyurethane urea prepolymer are completely used up, further urea groups form and the molar mass increases.

In the course of the chain extension said polyurethane urea prepolymer is reacted to form a polyurethane urea resin which is preferably linear and which has a carboxyl number of about 10 to about 50 mg KOH/g.

Steps (ii) and (iii) may have a temporal overlap or take place one after the other. For example, steps (ii) and (iii) may in part run simultaneously, the completion of the chain extension reaction occurring after the aqueous dispersion has been formed, i.e., within the dispersion particles which have already formed.

The chain extension is carried out by reacting one or more compounds, having at least two, preferably two, amino groups capable of addition to isocyanate groups, with the isocyanate-functional polyurethane urea prepolymer dispersed in water. Examples of compounds of this type are hydrazine and hydrazine derivatives, such as phenylhydrazine, as well as appropriate polyamines, such as ethylenediamine, 1,4-diaminobutane, 1,6-diaminohexane, diethylenetriamine and triethylenetetramine As already said, hydrazines and diamines in each case with two amino groups capable of addition to isocyanate groups are preferred. The reactivity of the isocyanate groups of the isocyanate- and carboxylate-functional polyurethane urea prepolymer is generally considerably greater towards the amino groups of the compound(s) having at least two amino groups capable of addition to isocyanate groups than towards water. Despite the presence of water, the chain extension in this case will take place initially or substantially by formation of urea groups by way of addition reaction between the isocyanate groups of the polyurethane urea prepolymer and the amino groups of the at least one compound having at least two amino groups capable of addition to isocyanate groups.

The one or more compounds having at least two amino groups capable of addition to isocyanate groups are preferably added as an aqueous solution to the aqueous dispersion of the isocyanate- and carboxylate-functional polyurethane urea prepolymer. This addition preferably takes place without a significant time-delay after the end of the dispersion formation in step (ii), for example, immediately or within less than 30 minutes after the end of step (ii).

As already mentioned, step (iii) is carried out with the at least one compound, having at least two amino groups capable of addition to isocyanate groups, as chain extender, and in the presence of water. It is preferred to work with a calculated NCO:(NH+NH2) equivalent ratio of about 0.9:1 to about 3:1, especially preferably corresponding to the stoichiometric ratio of about 1:1 to about 1.5:1.

The aqueous polyurethane urea resin dispersion, which is obtained after the completion of step (iii), has an inert organic solvent content of, for example, about 1 to about 15 wt. %, relative to polyurethane urea resin solids. The inert organic solvent content depends on the proportion of the inert organic solvent(s) employed in step (i). If a lower or almost zero inert organic solvent content of the aqueous polyurethane urea resin dispersion is desired, then inert organic solvent can be removed, in particular by distillation or vacuum distillation, until the desired inert organic solvent content is achieved.

The aqueous polyurethane urea resin dispersion obtained after completion of step (iii) and the possible partial or complete removal of inert organic solvent has a polyurethane urea resin solids content in the range of, for example, about 30 to about 47 wt. %. It is possible to adjust the polyurethane urea resin solids content, for example, by addition of water.

As already mentioned above, the waterborne base coat composition may, in addition to the aqueously dispersed polyurethane urea resin, contain one or more other binders. Such other binders are anionically and/or non-ionically stabilized aqueous binders as are conventional in the art of aqueous paint and coatings; examples include polyesters, polyurethanes, (meth)acrylic copolymer resins and/or hybrid binders derived from these classes of binders. Anionic stabilization is preferably achieved by at least partially neutralized carboxyl groups in the binder, while non-ionic stabilization is preferably achieved by lateral or terminal polyethylene oxide units in the binder.

The waterborne base coat composition may contain one or more conventional crosslinkers in a proportion corresponding to a solids contribution of 0 to about 40 wt. % of the resin solids of the waterborne base coat composition. Examples of such crosslinkers include conventional polyisocyanate crosslinkers and conventional melamine formaldehyde resin crosslinkers.

The waterborne base coat composition comprises one or more conventional pigments, for example, special effect pigments and/or pigments selected from among white, colored and black pigments. In other words, the waterborne base coat composition may be a solid color base coat composition or an effect base coat composition having a color and/or lightness flop.

Examples of special effect pigments are conventional pigments which impart to a coating color flop and/or lightness flop dependent on the angle of observation, such as, non-leafing metal pigments, for example, of aluminum, copper or other metals, interference pigments, such as, for example, metal oxide-coated metal pigments, for example, iron oxide-coated aluminum, coated mica, such as, for example, titanium dioxide-coated mica, graphite effect-imparting pigments, iron oxide in flake form, liquid crystal pigments, coated aluminum oxide pigments, coated silicon dioxide pigments.

Examples of white, colored and black pigments are the conventional inorganic or organic pigments known to the person skilled in the art, such as, for example, titanium dioxide, iron oxide pigments, carbon black, azo pigments, phthalocyanine pigments, quinacridone pigments, pyrrolopyrrole pigments, and perylene pigments.

The waterborne base coat composition may also contain fillers (extenders), for example, in a total proportion of 0 to about 30 wt. %, relative to the resin solids content. The fillers do not constitute part of the pigment content of the waterborne base coat composition. Examples are barium sulfate, kaolin, talcum, silicon dioxide and layered silicates.

The special effect pigments are generally initially introduced in the form of a conventional commercial aqueous or non-aqueous paste, optionally, combined with preferably water-dilutable organic solvents and additives and then mixed with aqueous binder. Pulverulent special-effect pigments may first be processed with preferably water-dilutable organic solvents and additives to yield a paste.

White, colored and black pigments and/or fillers may, for example, be ground in a proportion of the aqueous binder. Grinding may preferably also take place in a special aqueous paste resin. Grinding may be performed in conventional assemblies known to the person skilled in the art. The formulation is then completed with the remaining proportion of the aqueous binder or of the aqueous paste resin.

The waterborne base coat composition may comprise conventional additives, for example, in a total proportion of about 0.1 to about 10 wt. % active substance, wherein the percentage by weight is based on total waterborne base coat composition. Examples are antifoaming agents, wetting agents, adhesion promoters, catalysts, leveling agents, anti-cratering agents, rheology control agents, for example, thickeners, and light stabilizers, for example, UV absorbers and/or HALS-based compounds (HALS, hindered amine light stabilizers).

The waterborne base coat composition comprises water in a proportion of, for example, about 30 to about 80 wt. %, wherein the wt. % is based on the total weight of the waterborne base coat composition.

The waterborne base coat composition may comprise conventional organic solvents, for example, in a total proportion of preferably less than about 25 wt. %, particularly preferably, less than about 15 wt. %, wherein the percentage by weight is based on total waterborne base coat composition. These are conventional coating solvents, which may originate, for example, from the binder production or are added separately. Examples of such solvents are alcohols, for example, propanol, butanol, hexanol; glycol ethers, for example, diethylene glycol di-C1-C6-alkyl ether, dipropylene glycol di-C1-C6-alkyl ether, ethoxypropanol, ethylene glycol monobutyl ether; glycol ether esters, for example, methoxypropyl acetate, butyl glycol acetate; glycols, for example, ethylene glycol and/or propylene glycol, and the di- or trimers thereof; ketones, such as, methyl ethyl ketone, acetone, cyclohexanone, 4-hydroxy-4-methyl-2-pentanone; aromatic or aliphatic hydrocarbons, for example, toluene, xylene or linear or branched aliphatic C6-C12 hydrocarbons.

Step (2) of spray-applying the waterborne base coat composition on the substrate by electrostatically-assisted high speed rotary atomization to form a base coat layer may be carried out so as to spray-apply the waterborne base coat composition in one or more than one spray passes, each of which being performed by electrostatically-assisted high speed rotary atomization.

In an embodiment A of the process of the invention, step (2) may be followed by an additional step (2') prior to step (3) being performed. In such additional step (2') the same waterborne base coat composition like that employed in step (2) is pneumatically spray-applied to form a coating layer. The base coat layers applied in steps (2) and (2') have the same solids composition and together they form the base coat layer of the base coat/clear top coat multi-layer coating.

In another embodiment B of the process of the invention, step (2) may be followed by an additional step (2") prior to step (3) being performed. Here, the waterborne base coat composition spray-applied in step (2) comprises a free polyisocyanate crosslinker, while in said additional step (2") a waterborne base coat composition which is free of free polyisocyanate crosslinker is spray-applied to form a coating layer. The waterborne base coat composition spray-applied in additional step (2") may have the same or a different color than the waterborne base coat composition spray-applied in step (2). In other words, the waterborne base coat composition spray-applied in step (2") has the same or a different pigment composition than the waterborne base coat composition spray-applied in step (2) and it does not comprise free polyisocyanate crosslinker. The base coat layer applied in step (2) and the coating layer applied in step (2") have in any case a different overall composition, but together they form the base coat layer of the base coat/clear top coat multi-layer coating.

In a preferred variant of said embodiment B, the waterborne base coat composition spray-applied in step (2) has the same pigment composition like the waterborne base coat composition spray-applied in step (2") and it can be made from the latter by mixing it with the free polyisocyanate crosslinker or a preparation or solution thereof. In said preferred variant of embodiment B, the base coat layer applied in step (2) and the coating layer applied in step (2") have a different overall composition, but have the same pigment composition and together they form the base coat layer of the base coat/clear top coat multi-layer coating.

In still another embodiment C of the process of the invention, step (2) may be followed by an additional step (2'") prior to step (3) being performed. Here, a different coating composition (a coating composition other than the waterborne base coat composition employed in step (2)), in particular, another waterborne base coat composition than that employed in step (2), is spray-applied in step (2'") to form a color- and/or effect imparting coating layer which is transparent or semi-transparent. In other words, the coating layer formed in step (2'") is not visually opaque and the color of the finished multi-layer coating is determined by the color contributions of the base coat layer formed in step (2) and of the coating layer formed in step (2'"). The base coat layer applied in step (2) and the coating layer applied in step (2'") together form the base coat layer of the base coat/clear top coat multi-layer coating.

The base coat layer is the color- and/or special effect-imparting coating layer within the multi-layer coating produced by the process of the invention. In other words, the OEM multi-layer coating produced by the process of the invention may have a solid color (color independent on the observation angle) or an effect color (color having a color and/or lightness flop dependent on the observation angle).

The overall film thickness of the base coat layer, which may be comprised of two or more coating layers or sublayers, may be in the range of, for example, about 7 to about 40 μm.

The film thicknesses indicated herein for coating layers refer in each case to dry film thicknesses.

Application of the waterborne base coat composition or compositions can be followed by a drying procedure, in particular a brief flash-off phase of, for example, about 30 seconds to about 30 minutes at an air temperature of about 20 to about 100° C., after which in step (3) a clear coat composition is spray-applied to form the clear top coat layer in a film thickness of, for example, about 20 to about 60 μm (in particular in case of liquid clear coat) or, in an embodiment, for example, about 80 to about 150 μm (in particular in case of powder clear coat).

All known clear coat compositions are in principle suitable as the clear top coat. Usable clear coats are both solvent-borne one-component (1 pack) or two-component (2 pack) clear coats, water-dilutable 1 pack or 2 pack clear coats, powder clear coats or aqueous powder clear coat slurries.

After an optional flash-off phase, the base coat and the clear top coat layers are jointly cured in step (4), for example, by baking for about 15 to about 45 minutes at about 40 to about 185° C. object temperature, which depends, among others, on the substrate material.

EXAMPLES

Example 1

Preparation of an Aqueous Binder Latex

A reactor was charged with 688 pbw (parts by weight) of deionized water and 16 pbw (parts by weight) of RHODAPEX® EST30 (anionic surfactant available from Rhodia; 30 wt. % in water). The water and surfactant charge was heated to 80° C. under nitrogen atmosphere and held at that temperature throughout the reaction. A first stirred monomer emulsion consisting of 45 pbw of RHODAPEX® EST30, 349 pbw of deionized water, 317 pbw of methyl methacrylate, 317 pbw of butyl acrylate, 36 pbw of hydroxyethyl acrylate, 36 pbw of methacrylic acid and 7 pbw of allyl methacrylate was prepared separately. A solution of 3.2 pbw of ammonium peroxodisulfate (APS) in 100 pbw of deionized water was added to the reactor content and the first monomer emulsion was then added within 90 minutes to the reactor content. After all of the first monomer emulsion was in, the reactor content was held for an additional hour at 80° C., during which a second stirred monomer emulsion consisting of 15 pbw of RHODAPEX® EST30, 378 pbw of deionized water, 377 pbw of methyl methacrylate, 327 pbw of butyl acrylate and 7 pbw of allyl methacrylate and a solution of 13 pbw of 2-amino-2-methyl-1-propanol (90 wt. % in water) in 98 pbw of deionized water were separately prepared. The aqueous 2-amino-2-methyl-1-propanol solution was added slowly to the reaction mixture and then, a solution of 1.1 pbw of ammonium peroxodisulfate (APS) in 70 pbw of deionized water was added slowly to the reactor content. The second monomer emulsion was then added within 90 minutes to the reactor content. After the addition was complete, the reactor content was held at 80° C. for an additional hour. The aqueous binder latex obtained was then cooled to room temperature.

Example 2a

Preparation of an Aqueous Polyurethane Binder Dispersion 23.95 pbw (parts by weight) of a polyesterdiol having a hydroxyl value of 112 mg of KOH/g (produced from hexanediol and a 2:1 molar mixture of adipic acid and isophthalic acid) and 1.31 pbw of dimethylol-propionic acid and 1.04 pbw of triethylamine were mixed with 0.36 pbw of dibutyl amine and 2.98 pbw of acetone in a reaction vessel equipped with stirrer and reflux condenser. After heating the mixture to 50° C. 9.40 pbw of isophorone diisocyanate were added and the mixture was stirred at 50° C. until an NCO value between 2.2 and 1.9% was obtained. 54.50 pbw of deionized water were then added to form an aqueous dispersion, after which 6.45 pbw of a 6.25 wt. % aqueous solution of ethylenediamine were added at 40° C. The temperature was then raised back up to 50° C. and this temperature was maintained for 2 hours. After cooling an aqueous polyurethane urea resin dispersion with 35 wt. % resin solids was obtained.

Example 2b

Preparation of an Aqueous Polyurethane Binder Dispersion 24.04 pbw (parts by weight) of a polyesterdiol having a hydroxyl value of 112 mg of KOH/g (produced from hexanediol and a 2:1 molar mixture of adipic acid and isophthalic acid) and 1.32 pbw of dimethylol-propionic acid and 1.04 pbw of triethylamine were mixed with 3.00 pbw of acetone in a reaction vessel equipped with stirrer and reflux condenser. After heating the mixture to 50° C. 9.43 pbw of isophorone diisocyanate were added and the mixture was stirred at 50° C. until an NCO value between 2.2 and 1.9% was obtained. 54.70 pbw of deionized water were then added to form an aqueous dispersion, after which 6.47 pbw of a 6.25 wt. % aqueous solution of ethylenediamine were added at 40° C. The temperature was then raised back up to 50° C. and this temperature was maintained for 2 hours. After cooling an aqueous polyurethane urea resin dispersion with 35 wt. % resin solids was obtained.

Examples 3a and 3b

Preparation of White Waterborne Base Coats

White waterborne base coats 3a and 3b were prepared by mixing the following constituents:

|  | White waterborne base coats | |
|---|---|---|
|  | 3a *) | 3b **) |
| Constituents: | | |
| TiO$_2$ Dispersion [1] | 26.4 | 26.4 |
| Talc Dispersion [2] | 4.6 | 4.6 |
| Binder dispersion of Example 2a | 18.7 | |
| Binder dispersion of Example 2b | | 18.7 |
| Binder latex of Example 1 | 6.3 | 6.3 |
| Defoamer [3] | 2.1 | 2.1 |
| Ethylene glycol monobutyl ether | 5.8 | 5.8 |
| Diethylene glycol monobutyl ether | 1.4 | 1.4 |
| Ethylene glycol monohexyl ether | 0.5 | 0.5 |
| ®MELAMINE MF 900 [4] | 6.9 | 6.9 |
| Deionized water | 8 | 8 |
| Thickener [5] | 2.1 | 2.1 |
| Deionized water | 4.6 | 4.6 |
| DMEA, 10 wt. % solution in water | 4.8 | 4.8 |
| Mineral spirit | 2.6 | 2.6 |
| Deionized water | 5.2 | 5.2 |

*) according to the invention
**) comparative example
[1] Mixture of 72 pbw TiO$_2$, 7.2 pbw of 35 wt. % aqueous paste resin, 5.2 pbw of an anionic surfactant (48 wt. % in water), 2 pbw DMEA solution (10 wt. % in water), 3 pbw DPM, 1.5 pbw defoamer [3] and 9.1 pbw deionized water
[2] Mixture of 36 pbw talc, 50.5 pbw deionized water, 6 pbw of an anionic surfactant (48 wt. % in water), 1.5 pbw DMEA solution (10 wt. % in water), 4 pbw thickener [5], 2 pbw defoamer [3]
[3] SURFYNOL ® 104DPM from Air Products, (50 wt. % in DPM)
[4] HMMM type melamine resin from Cytec
[5] Mixture of 33 pbw VISCALEX ® HV 30 from Allied Colloids, 2.5 pbw DMEA and 64.5 pbw of deionized water.

DMEA, Dimethylethanolamine
DPM, Dipropylene glycol mono methylether

A 60 cm long strip of masking tape (Tesa 4174—1.9 mm) was applied to the middle of a coil coated test panel (size: 30 cm×60 cm, sheet thickness: 0.75 mm) in longitudinal direction. A coating layer of white waterborne base coat 3a was then sprayed as a 10 μm to 40 μm wedge onto the test panel provided with the tape strip Immediately after drying for 3 minutes at 80° C. oven temperature the strip of tape was pulled slowly away from the panel with the tape held at a 45 degree angle from the panel.

The procedure was repeated with the white waterborne base coat 3b instead of white waterborne base coat 3a.

The formation of base coat threads between the edges of the taped and the non-taped parts of the panels was determined:

| 3b | 3a |
|---|---|
| Start of thread formation at 15 μm base coat film thickness | No thread formation |

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A process for the production of an OEM base coat/clear top coat multi-layer coating comprising the steps of:
    (1) providing a substrate to be provided with an OEM base coat/clear top coat multi-layer coating,
    (2) spray-applying a waterborne base coat composition on said substrate by electrostatically-assisted high speed rotary atomization to form a base coat layer,
    (3) spray-applying a clear coat composition on the base coat layer to form a clear top coat layer, and
    (4) jointly curing the base coat and the clear top coat layers,
    wherein the waterborne base coat composition comprises water, pigment(s) and resin solids consisting of binder solids and, optionally, crosslinker solids,
    wherein said binder solids consist of about 20 to about 100 wt. % of an aqueously dispersed polyurethane urea resin with a carboxyl number of about 10 to about 50 mg KOH/g and 0 to about 80 wt. % of other binders,
    wherein the sum of the wt. % totals 100 wt. %,
    wherein said aqueously dispersed polyurethane urea resin is made by a process comprising the steps:
        (i) producing a non-gelled polyurethane urea prepolymer with a free isocyanate group content of about 0.5 to about 4.5 wt. % by reacting at least one polyol, at least one compound having one primary or secondary amine group and a molar mass of about 31 to about 300, at least one tertiary amine-neutralized polyhydroxycarboxylic acid and at least one polyisocyanate, in the presence of at least one inert organic solvent,
        (ii) converting the so obtained inert organic solvent solution of the polyurethane urea prepolymer into an aqueous dispersion by mixing with water, and
        (iii) chain extending the polyurethane urea prepolymer by reacting the free isocyanate groups thereof with at least one compound having at least two amino groups capable of addition to isocyanate groups to form further urea groups,
    wherein the at least one compound having one primary or secondary amine group and a molar mass of about 31 to about 300 is used in a proportion of about 0.02 to about 0.15 equivalents relative to the NCO provided by the at least one polyisocyanate employed in step (i).

2. The process of claim 1, wherein the substrate provided in step (1) is a substrate made by a serial production process and is selected from the group consisting of automobile bodies, automobile body parts and other car parts.

3. The process of claim 1, wherein the at least one compound having one primary or secondary amine group and a molar mass of about 31 to about 300 is a monoamine having the amine group bonded to (cyclo)aliphatic carbon.

4. The process of claim 3, wherein the monoamine is selected from 2-ethylhexylamine and di-n-butylamine.

5. The process of claim 1, wherein the at least one polyhydroxycarboxylic acid is dimethylol propionic acid or dimethylol butyric acid.

6. The process of claim 1, wherein step (i) is carried out with an NCO:total OH equivalent ratio of about 2:1 to about 1.05:1.

7. The process of claim 1, wherein the polyurethane urea prepolymer formed in step (i) is linear.

8. The process of claim 1, wherein step (2) is followed by an additional step (2') prior to step (3) being performed, wherein in step (2') the same waterborne base coat composition like that employed in step (2) is pneumatically spray-applied to form a coating layer.

9. The process of claim 1, wherein step (2) is followed by an additional step (2") prior to step (3) being performed, wherein the waterborne base coat composition spray-applied in step (2) comprises a free polyisocyanate crosslinker, and wherein in step (2") a waterborne base coat composition which is free of free polyisocyanate crosslinker is spray-applied to form a coating layer.

10. The process of claim 9, wherein the waterborne base coat composition spray-applied in step (2") has the same pigment composition like the waterborne base coat composition spray-applied in step (2).

11. The process of claim 1, wherein step (2) is followed by an additional step (2''') prior to step (3) being performed, wherein in step (2''') a coating composition other than the waterborne base coat composition employed in step (2) is spray-applied to form a color- and/or effect-imparting coating layer which is transparent or semi-transparent.

* * * * *